(12) United States Patent
Voss (10) Patent No.: US 12,363,452 B2
(45) Date of Patent: Jul. 15, 2025

(54) REMOTE CONTROL DEVICE FOR A MOTION PICTURE CAMERA

(71) Applicant: Arnold & Richter Cine Technik Gmbh & Co. Betriebs KG, Munich (DE)

(72) Inventor: Hendrik Voss, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 945 days.

(21) Appl. No.: 17/501,045

(22) Filed: Oct. 14, 2021

(65) Prior Publication Data

US 2022/0113493 A1     Apr. 14, 2022

(30) Foreign Application Priority Data

Oct. 14, 2020 (DE) .......................... 202020105870.3

(51) Int. Cl.
*H04N 23/959* (2023.01)
*G03B 3/12* (2021.01)
(Continued)

(52) U.S. Cl.
CPC ............. *H04N 23/959* (2023.01); *G03B 3/12* (2013.01); *H04N 23/69* (2023.01); *G03B 13/20* (2013.01);
(Continued)

(58) Field of Classification Search
None
See application file for complete search history.

(56) References Cited

U.S. PATENT DOCUMENTS

| | | | |
|---|---|---|---|
| 4,712,900 A * | 12/1987 | Hamano | G02B 7/08 396/354 |
| 6,161,933 A | 12/2000 | Tschida et al. | |

(Continued)

FOREIGN PATENT DOCUMENTS

| | | |
|---|---|---|
| DE | 4219331 A1 | 12/1993 |
| DE | 19629484 A1 | 1/1998 |

(Continued)

OTHER PUBLICATIONS

Extended European Search Report dated Feb. 25, 2022 issued in connection with Application No. 21202492.1.
German Search Report dated Jun. 11, 2021 in connection with German Patent Application No. 20 2020 105 870.3.

*Primary Examiner* — Clayton E. LaBalle
*Assistant Examiner* — Diana Hancock
(74) *Attorney, Agent, or Firm* — Amster, Rothstein & Ebenstein LLP (57) ABSTRACT

A remote control device is configured for a motion picture camera which has a lens and at least one lens focus setting motor for setting a focus distance of the lens and with which at least one distance measurement device for determining a distance measurement signal is associated. The remote control device comprises a portable operating unit having a base part, a first operating element that is movable into a continuously variable setting position, and a second operating element. In a manual focus operating mode a control device determines a manual focus setting value for the lens focus setting motor in dependence on the continuously variable setting position of the first operating element and outputs the manual focus setting value. In a focus transition operating mode, in dependence on an actuation of the second operating element the control device causes the lens focus setting motor to set the focus distance in accordance with a sequence of a plurality of different intermediate focus setting (Continued)

values that converge to a second desired starting from a first desired value of the focus distance. The first desired value or the second desired value of the focus distance corresponds to the distance measurement signal of the distance measurement device.

22 Claims, 3 Drawing Sheets

(51) Int. Cl.
  *G03B 13/20* (2021.01)
  *G03B 19/18* (2021.01)
  *H04N 23/69* (2023.01)
  *G03B 17/56* (2021.01)
  *H04N 23/55* (2023.01)
(52) U.S. Cl.
  CPC .............. *G03B 17/56* (2013.01); *G03B 19/18* (2013.01); *H04N 23/55* (2023.01)

(56) References Cited

U.S. PATENT DOCUMENTS

| | | |
|---|---|---|
| 2003/0174414 A1 | 9/2003 | Sasaki |
| 2008/0225234 A1 | 9/2008 | Bauer et al. |
| 2008/0284899 A1 | 11/2008 | Haubmann et al. |
| 2011/0013061 A1 | 1/2011 | Hoda et al. |
| 2012/0019702 A1 | 1/2012 | Richter |
| 2019/0132527 A1* | 5/2019 | Lazic ..................... H04N 23/90 |
| 2020/0012172 A1* | 1/2020 | Irie ........................ H04N 23/63 |

FOREIGN PATENT DOCUMENTS

| | | | |
|---|---|---|---|
| DE | 102004015947 A1 | 10/2005 | |
| DE | 102004037296 A1 | 3/2006 | |
| DE | 102017128393 A1 | 6/2019 | |
| EP | 0574105 A1 | 12/1993 | |
| JP | 2013218049 A * | 10/2013 | ............. G02B 7/282 |
| WO | 2010046237 A1 | 4/2010 | |
| WO | 2020061604 A1 | 4/2020 | |

* cited by examiner

Fig.1

REMOTE CONTROL DEVICE FOR A MOTION PICTURE CAMERA

The invention relates to a remote control device for a motion picture camera which has a lens and at least one lens focus setting motor for setting a focus distance of the lens and with which at least one distance measurement device for determining a distance measurement signal is associated. The remote control device comprises a portable operating unit having a base part, a first operating element that is movable relative to the base part into a continuously variable setting position, and a second operating element. The remote control device further comprises a control device that is configured to determine a manual focus setting value for the lens focus setting motor in dependence on the continuously variable setting position of the first operating element and to output the manual focus setting value in a manual focus operating mode.

An electronic motion picture camera typically comprises an integrated optical system (camera objective, camera lens) or a lens mount to be able to selectively connect an interchangeable lens (interchangeable objective) that is adapted to specific recording situations. To be able to record the images captured by means of the optical system, an electronic image sensor for generating image signals from incident light and an image signal processing device for converting the image signals into a digital image data stream are usually provided.

A remote control device may be provided to be able to control an electronic motion picture camera (in particular a video camera) or also a conventional motion picture camera (in particular a film camera) to record motion picture sequences and/or to be able to set recording parameters or change them during a recording. A cameraman guiding the motion picture camera thereby only has to ensure the correct alignment of the camera for recording a desired image section, while the corresponding setting of the recording parameters may be taken over by a further person, in particular a camera assistant or a focus puller. For example, provision may be made to set the image recording rate, the shutter speed, the aperture (f-stop), the focus distance or focus, and/or the focal length (zoom factor) of the camera lens.

The setting of recording parameters of the camera, and in particular of the aperture (f-stop), the focus distance and the focal length, may take place via respective lens setting motors that may be integrated into the camera lens or that may typically be arranged as a separate, external unit outside the camera lens. Such a lens setting motor may be connected to a rotatable lens ring of the camera lens such that the respective parameter may be changed by rotating the lens ring by means of the lens setting motor. A remote-controlled setting of the recording parameters may thus take place by the transmission of setting signals to the respective lens setting motor by means of a remote control device in order to transfer the associated lens ring to a desired rotational position.

To be able to predefine a control command for a lens setting motor for setting a specific parameter value, a portable operating unit of such a remote control device may have an operating element that is movable (e.g. rotatable) relative to a base part and whose setting position determines the respective control command. The control device may directly or indirectly determine an associated desired value from the setting position of the operating element and may directly or indirectly output said associated desired value as a control command to the lens setting motor. For example, the motion picture camera may have a lens focus setting motor for setting a focus distance of the lens, wherein, in a manual focus operating mode of the remote control device, the user (camera assistant or focus puller) may, by means of the movable operating element, set a manual focus setting value as a desired value for the focus distance to be set. Further operating elements may be provided at the operating unit for additional control tasks, for example, to be able to change the value of the aperture (f-stop) by remote control.

Such a remote control device is, for example, known from DE 196 29 484 A1, WO 2010/046237 A1, and DE 10 2017 128 393 A1. Furthermore, DE 42 19 331 A1, for example, shows a remote control device for setting different recording parameters before and in particular during a motion picture recording by controlling respective lens setting motors.

A distance measurement device for determining a distance measurement signal may also be associated with a motion picture camera. The distance measurement signal may directly or indirectly correspond to a measured distance of the motion picture camera (in particular the image plane) relative to a motif in the object space. Based on such distance measurement signals, an autofocus operating mode is, for example, possible in which the focus distance is set in accordance with the distance measured and may in particular also follow a varying distance of the motif. Such distance measurement apparatus are known from DE 10 2004 015 947 A1 and DE 10 2004 037 296 A1.

During the recording of a motion picture sequence, it may also be desired to switch between an autofocus operating mode (automatic focusing in accordance with the distance measurement device) and a manual focus operating mode (manual focusing by means of the remote control device). However, the problem may occur on such a change of the source of the desired value for the lens focus setting motor that the focus distance set at the lens changes abruptly in an undesirable manner.

It is an object of the invention to provide a remote control device for controlling a lens focus setting motor of a motion picture camera that enables a smooth transition on a change of the source for the desired value of the focus distance to be set.

This object is satisfied by a remote control device having the features of claim 1, and in particular in that the control device of the remote control device is configured, in dependence on an actuation of the second operating element of the operating unit, to cause the lens focus setting motor in a focus transition operating mode of the remote control device to set the focus distance in accordance with a sequence of a plurality of different intermediate focus setting values that converge to a second desired value of the focus distance starting from a first desired value of the focus distance, wherein the first desired value or the second desired value of the focus distance corresponds to the distance measurement signal of the distance measurement device.

On the one hand, the remote control device thus enables a manual focusing by moving the first operating element relative to the base part of the operating unit. The first operating element may be moved into a continuously variable setting position to predefine a manual focus setting value for the focus distance or to change the manual focus setting value in a continuously variable manner. The manual focus setting value thus forms a desired value that may be used depending on the operating mode of the remote control device, but that does not necessarily have to be used.

On the other hand, the user may namely, by the second operating element of the operating unit, effect the control device of the remote control device to cause the lens focus setting motor set the focus distance in accordance with a sequence of a plurality of intermediate focus setting values, in particular by a direct or indirect control, wherein these intermediate focus setting values converge to a second desired value of the focus distance starting from a first desired value. A continuous or substantially continuous transition between the first desired value and the second desired value of the focus distance may hereby be brought about (focus transition operating mode of the remote control device).

This transition may be triggered by means of the second operating element or may also be actively influenced in its course, as explained in the following for some embodiments. The individual intermediate focus setting values may be determined by the control device of the remote control device or by a control unit disposed downstream (for example, based on an execution command of the control device of the remote control device).

The first desired value may form a start desired value of the focus distance and the second desired value may form a target desired value of the focus distance. The intermediate focus setting values may in particular form current desired values of the focus distance that are to be set by the lens focus setting motor and that are composed of a decreasing portion of the first desired value (as the start desired value) and an increasing portion of the second desired value (as the target desired value) during the focus transition operating mode. The first desired value and the second desired value of the focus distance may be fixed values or may also still be adaptable during the transition.

In the focus transition operating mode, one of the two desired values of the focus distance (first desired value or second desired value) may correspond to the distance measurement signal of the associated distance measurement device. For this purpose, the respective desired value may in particular be formed by the distance measurement signal or derived therefrom. This desired value may also still be adaptable or adapted during the focus transition operating mode, in particular if it is the second desired value or the target desired value and the distance measurement signal still changes during the focus transition operating mode. The focus transition operating mode of the remote control device may thus in particular serve for a transition between the manual focus operating mode and an autofocus operating mode (automatic focusing in accordance with the distance measurement device) or for a transition between different autofocus operating modes (as will be explained in the following).

Due to such a focus transition operating mode of the remote control device, a smooth transition is thus made possible on a change of the operating mode or on a change from a first desired value to a second desired value of the focus distance, in particular on a change of the source for the respective desired value.

In connection with the invention, a continuous or substantially continuous transition is also to be understood as the plurality of discrete values that result in the case of a digital signal processing, that correspond to the sampling resolution (e.g. of an analog-to-digital converter), and that at least appear to be quasi-continuous.

Advantageous embodiments of the invention will be explained in the following.

In some embodiments, the sequence of the plurality of different intermediate focus setting values may correspond to a continuous or substantially continuous convergence of the focus distance from the first desired value to the second desired value.

In some embodiments, the one of the first and second desired values of the focus distance may correspond to the distance measurement signal of the associated distance measurement device, wherein the other of the first and second desired values of the focus distance corresponds to the manual focus setting value in accordance with the first operating element or a further distance measurement signal. The distance measurement signal and the further distance measurement signal may be different from one another and may in particular correspond to the distances of different motifs in the object space. The distance measurement signal and the further distance measurement signal may be generated by the same distance measurement device (for example, in the case of an image sensor-based distance measurement). Alternatively thereto, the further distance measurement signal may be generated by a further distance measurement device. In the latter case, the distance measurement device and the further distance measurement device may be associated with the same motion picture camera.

Thus, depending on the embodiment, one of the two desired values of the focus distance, which is to form the start desired value or the target desired value of the transition, may correspond to the distance measurement signal. Furthermore, another of the two desired values of the focus distance may correspond to the manual focus setting value (in particular for a transition between a manual focus operating mode and an autofocus operating mode). However, depending on the embodiment, the other of the two desired values of the focus distance may also correspond to a further distance measurement signal (in particular to the same or a further associated distance measurement device). For example, it may be desired for the focus distance to initially follow a first motif in the object space (first autofocus operating mode), but then to change and to follow a second motif in the object space (second autofocus operating mode). Thus, the focus transition operating mode may effect a transition between a first and a second autofocus operating mode, with no direct manual focusing by means of the remote control device taking place during the first and the second autofocus operating mode and the focus transition operating mode that takes place therebetween (however, in some embodiments, the transition may be controllable by means of the first operating element, as will be explained in the following).

In some embodiments, the desired value of the focus distance may also still change during the focus transition operating mode, in particular if it is the second desired value or the target desired value. However, in some embodiments, provision may also be made that a movement of the first operating element is ignored during the focus transition operating mode, in particular if the manual focus setting value is the first desired value or the start desired value.

In some embodiments, the second desired value of the focus distance may already be defined at the start of the focus transition operating mode and may thus be fixed for the total duration of the focus transition operating mode. In other embodiments, the second desired value of the focus distance may merely be preliminarily defined at the start of the focus transition operating mode and may still be adaptable during the focus transition operating mode (for example, if the second desired value is predefined by a distance measurement device and the distance of the motif still changes during the focus transition operating mode).

In some embodiments, the intermediate focus setting values may correspond to a respective interpolation between the first desired value of the focus distance and the second desired value of the focus distance. Such an interpolation may, for example, correspond to a weighting, for example, with a linear course of the weighting between the first desired value and the second desired value. Such an interpolation may also still be dynamically adaptable during the focus transition operating mode of the remote control device, in particular to a second desired value that changes during the focus transition operating mode or to the target desired value.

In some embodiments, the different intermediate focus setting values may correspond to differently weighted interpolations between the first desired value of the focus distance and the second desired value of the focus distance.

In some embodiments, the control device may be configured to determine and to output the intermediate focus setting values (in particular as current desired values) in order to directly or indirectly control the lens focus setting motor. However, in some embodiments, the final determination of the intermediate focus setting values may also take place outside the control device, for example, when a calculation of intermediate focus setting values is to be performed based on two different distance measurement signals and the control device merely outputs the execution command for this purpose.

In some embodiments, the control device may be fully integrated into the operating element.

In other embodiments, only one part of the control device may be integrated into the operating unit, wherein another part of the control device is arranged at the motion picture camera. In such embodiments, the control device may have a decentralized design (e.g. with an operating unit control unit and with a lens control unit associated with the motion picture camera), wherein the different parts of the control device may communicate with one another by radio or by cable. In the case of such a distributed arrangement of the control device, the part arranged at the operating unit may have an output device that is configured to transmit position signals of a position encoder associated with the first and/or the second operating element to the part of the control device arranged at the motion picture camera.

Said interpolation may in particular be performed by the part of the control device of the remote control device arranged at the operating unit. If the interpolation is based on a distance measurement signal of a distance measurement device of the associated motion picture camera, the distance measurement signal, however, has to be transmitted to the operating unit. Alternatively thereto, the part of the control device arranged at the operating unit may be configured to only output a command for using intermediate focus setting values in the focus transition operating mode.

Thus, the portable operating unit may also only indirectly control the lens focus setting motor, wherein a command is output that predefines the operating mode, and wherein, if necessary, the values required as a calculation basis are output, in particular the current manual focus setting value or the transition setting value explained in the following. In such an embodiment, the operating unit or the part of the control device of the remote control device located there therefore only supplies the necessary commands and values, wherein an interpolation may be performed by the part of the control device (e.g. the lens control unit) associated with the motion picture camera.

In some embodiments, the control device may e.g. have one or more microprocessors.

In some embodiments, the first operating element may be rotatable relative to the base part of the operating unit, for example as a rotary knob. In some embodiments, the first operating element may be rotatable without restriction relative to the base part of the operating unit or may only be rotatable between two rotary abutments.

In some embodiments, the base part of the operating unit may have a position encoder that is configured to detect the continuously variable setting position of the first operating element relative to the base part and to generate a corresponding position signal. The control device may be configured to determine the manual focus setting value in dependence on this position signal, for example in accordance with a predetermined mapping rule.

In some embodiments, the base part of the operating unit may have an electronic display device for displaying desired values and/or actual values of the focus distance of the lens. The control device may in particular be configured to receive an actual value of a set focus distance of the lens. Such actual values of the focus distance may be known on the basis of a transmission from the associated motion picture camera and may be displayed to the user as an orientation. Position measurement values (in particular so-called encoder values) of the lens focus setting motor may, for example, be used as actual values. The electronic display device may in particular be touch-sensitive to also serve as an interface for user inputs.

In some embodiments, the operating unit may have an interface for communicating with the motion picture camera, in particular a radio module for wirelessly transmitting desired values of the focus distance, other values, or commands to the motion picture camera, and/or for wirelessly receiving data from the motion picture camera (e.g. actual values of the focus distance). Such an interface or such a radio module may be connected to the control device. Alternatively to a wireless communication, a wired connection may be provided.

In a general first embodiment, the second operating element may be movable relative to the base part of the operating unit between a first control position and a second control position into continuously variable intermediate positions, wherein the control device is configured to determine a respective transition setting value in dependence on the respective intermediate position of the second operating element, wherein the intermediate focus setting values depend on the respective transition setting value. Thus, a transition setting value may be derived from an intermediate position of the second operating element and may correspond to a desired degree of transition between the first desired value and the second desired value of the focus distance. This transition setting value may then be used as the basis for determining a respective intermediate focus setting value. For example, the respective transition setting value may be directly or indirectly used as a weighting of an interpolation. The user may hereby individually manually predefine a desired degree and/or time development of the transition.

In some embodiments, the source of the desired value for the focus distance may be selected based on the first or second control position of the second operating element and a desired intermediate focus setting value may be selected as the desired value actually to be set by moving the second operating element into one of the intermediate positions.

In some embodiments, the intermediate focus setting values may correspond to an interpolation, weighted in accordance with the respective transition setting value, between the first desired value of the focus distance and the second desired value of the focus distance. The interpolation for determining the respective intermediate focus setting value may in particular correspond to a variable weighting between the distance measurement signal of the distance measurement device, on the one hand, and the manual focus setting value in accordance with the first operating element or a further distance measurement signal, on the other hand, wherein the weighting depends on the respective transition setting value in accordance with the intermediate position of the second operating element.

In some embodiments, the second operating element of the operating unit may be linearly or rotatably movable relative to the base part, for example as a slide control or a rotary knob.

In some embodiments, the first control position of the second operating element may correspond to a first end abutment and the second control position of the second operating element may correspond to a second end abutment. The first control position and the second control position may hereby correspond to defined setting positions of the second operating element that may be felt by the user as mechanical abutments that limit the possible movement of the second operating element. Alternatively thereto, provision may, however, also be made that the second operating element may be moved, starting from an intermediate position, beyond the first control position or the second control position (for example, if the second operating element is rotatable without restriction or is designed as a virtual operating element at an electronic display device). In such embodiments, the source of the desired value for the focus distance may in particular be selected by a reaching or a traveling over of the first or second control position. The first and second control positions may be displayed to the user at an electronic display device in some embodiments. Provided that no end abutments are provided, the reaching or traveling over of the first or second control position may be haptically signaled (for example, by vibration) to the user in some embodiments.

In some embodiments, the base part of the operating unit may have a position encoder that is configured to detect a respective setting position of the second operating element relative to the base part and to generate a corresponding position signal, wherein the control device is configured to determine the respective transition setting value in dependence on the position signal.

The second operating element of the operating unit may in particular be an operating element (for example a slide control) that, in an aperture setting operating mode different from the focus transition operating mode, serves to predefine a desired value of the aperture (f-stop) of the lens of the associated motion picture camera. The control device may be configured to determine and to output aperture setting values for a lens aperture setting motor of the motion picture camera in the aperture setting operating mode in dependence on the continuously variable intermediate positions of the second operating element. Thus, the same operating element may perform different functions in different operating modes. A switching between the focus transition operating mode and the aperture setting operating mode may, for example, take place by operating mode switches. Such an operating mode switch may also be designed as a virtual switch of a touch-sensitive display device of the operating unit.

In accordance with a first variant of the general first embodiment, the control device may be configured,
in the case that the second operating element of the operating unit is moved into the first control position, to cause the lens focus setting motor to set the focus distance in accordance with the distance measurement signal of the distance measurement device;
in the case that the second operating element is moved into the second control position, to cause the lens focus setting motor to set the focus distance in accordance with the manual focus setting value; and
in the case that the second operating element is moved into one of the continuously variable intermediate positions, to cause the lens focus setting motor to set the focus distance in accordance with the respective intermediate focus setting value.

Thus, the distance measurement signal and the manual focus setting value may serve as the first desired value and the second desired value, or vice versa. The focus transition operating mode may hereby effect a transition between a manual focus operating mode and an autofocus operating mode.

In such embodiments, the intermediate focus setting values may in particular correspond to an interpolation between the distance measurement signal of the distance measurement device and the manual focus setting value in accordance with the setting position of the first operating element. In this respect, the interpolation may in particular be weighted in accordance with the respective transition setting value of the second operating element.

In such embodiments, the control device may be configured to receive the distance measurement signal of the distance measurement device; to determine the intermediate focus setting values in dependence on the manual focus setting value, the distance measurement signal and the respective transition setting value; and to output the intermediate focus setting values.

In accordance with a second variant of the general first embodiment, the control device may be configured,
in the case that the second operating element is moved into the first control position, to cause the lens focus setting motor to set the focus distance in accordance with the distance measurement signal of the distance measurement device;
in the case that the second operating element is moved into the second control position, to cause the lens focus setting motor to set the focus distance in accordance with a further distance measurement signal; and
in the case that the second operating element is moved into one of the continuously variable intermediate positions, to cause the lens focus setting motor to set the focus distance in accordance with the respective intermediate focus setting value.

Thus, the distance measurement signal of a first distance measurement device and the further distance measurement signal (in particular of the first distance measurement device or of a second distance measurement device) may serve as a first desired value and a second desired value, or vice versa. The focus transition operating mode may hereby effect a transition between a first and a second autofocus operating mode when the focus distance first corresponds to and/or is to follow a first motif in the object space (first autofocus operating mode) and then, however, is to correspond to and/or to follow a second motif in the object space (second autofocus operating mode).

In such embodiments, the intermediate focus setting values may correspond to an interpolation between the distance measurement signal of the distance measurement device and the further distance measurement signal. In this respect, the interpolation may in particular be weighted in accordance with the respective transition setting value of the second operating element.

In such embodiments, the control device may be configured to receive the distance measurement signal of the distance measurement device and the further distance measurement signal; to determine the intermediate focus setting values in dependence on the distance measurement signal, the further distance measurement signal and the respective transition setting value; and to output the intermediate focus setting values.

In a general second embodiment, the focus transition operating mode of the remote control device may be able to be triggered by the actuation of the second operating element of the operating unit, wherein the control device is configured to cause the lens focus setting motor in the focus transition operating mode to set the focus distance in accordance with the sequence of a plurality of different intermediate focus setting values in accordance with a predetermined course of the transition between the first desired value of the focus distance and the second desired value of the focus distance.

In such an embodiment, the second operating element may therefore substantially serve to trigger the focus transition operating mode, wherein an automatic transition of the focus distance from the start desired value to the target desired value may subsequently take place in accordance with a predetermined course. This predetermined course may in particular be controlled by the control device without any further activity of the user being necessary. In this general second embodiment, one of the two desired values of the focus distance may also correspond to the distance measurement signal of the associated distance measurement device. The other of the two desired values of the focus distance may correspond to the manual focus setting value in accordance with the first operating element of the operating unit (in particular for a transition between a manual focus operating mode and an autofocus operating mode), or the other of the two desired values of the focus distance may correspond to a further distance measurement signal (in particular for a transition between a first autofocus operating mode and a second autofocus operating mode).

In some embodiments, the different intermediate focus setting values may correspond to differently weighted interpolations between the first desired value of the focus distance and the second desired value of the focus distance, wherein the weighting of the interpolation varies in accordance with the predetermined course of the transition such that a continuous transition of the setting of the focus distance may be automatically triggered by the actuation of the second operating element.

In some embodiments, the predetermined course of the transition (or the predetermined course of the weighting of the interpolation) may vary in accordance with a predetermined time duration or a predetermined speed.

In some embodiments, the predetermined course of the transition (or the predetermined course of the weighting of the interpolation) may correspond to a linear ramp.

In some embodiments, the predetermined course of the transition (or the predetermined course of the weighting of the interpolation) may be stored in the control device.

In some embodiments, the control device may be configured to store a plurality of different predetermined courses of the transition (or of the weighting of the interpolation).

In some embodiments, the predetermined course of the transition may be stored as a value table or as a calculation rule.

In some embodiments, the remote control device may have an interface via which a desired course of the transition (or of a weighting of the interpolation) may be programmed by a user. This may in particular take place via the already mentioned electronic display device of the operating unit.

In some embodiments, the second operating element may be movable relative to the base part between a predetermined number of discrete selection positions, in particular between two or three discrete selection positions. In some embodiments, the second operating element may comprise a push button, a button, a sliding switch, or a virtual operating element of an electronic display device.

The invention will be explained in the following purely by way of example with reference to embodiment examples and to the drawings.

There are shown

Figure 1:
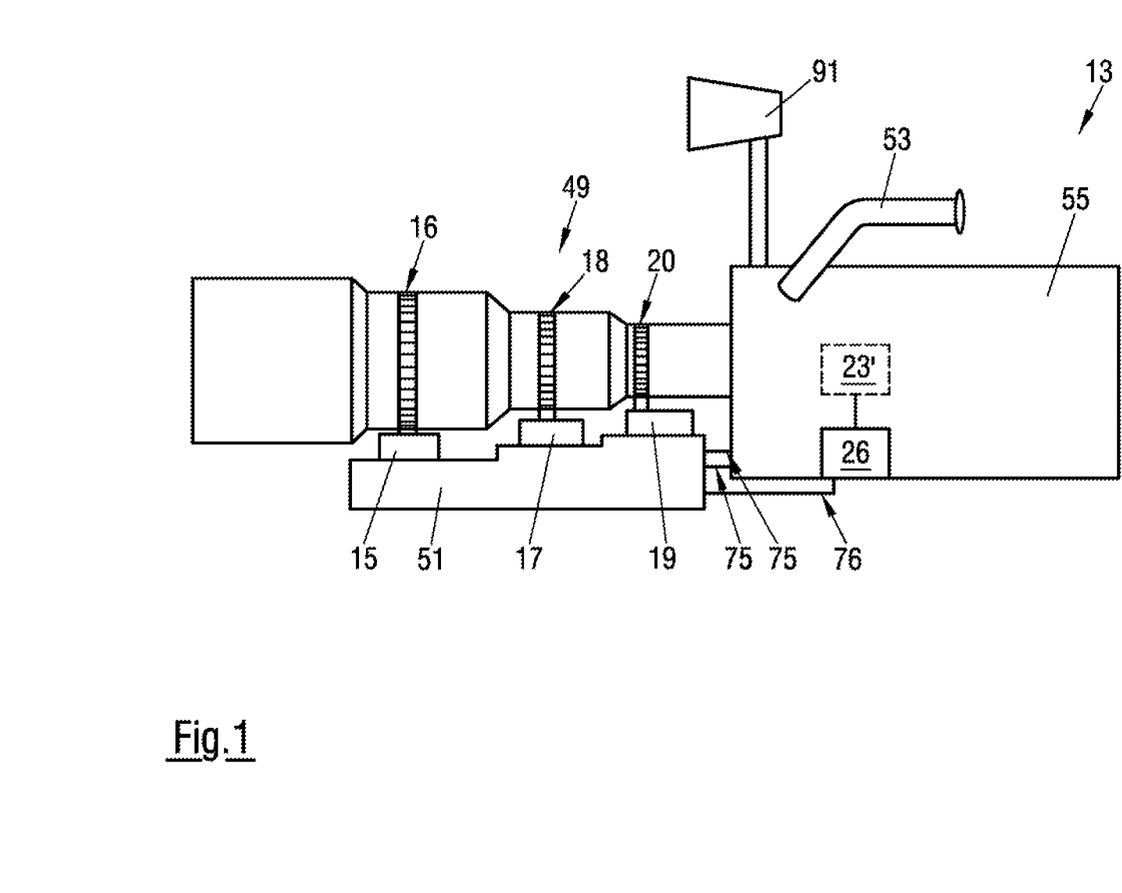
FIG. 1 a schematic representation of a motion picture camera having lens setting motors.

FIG. 1 shows a motion picture camera 13 comprising a camera body 55 to which an interchangeable lens 49 is fastened. Due to the design of the motion picture camera 13 with an interchangeable lens 49, other kinds of lenses may in particular also be connected to the camera body 55. The interchangeable lens 49 has three lens rings 16, 18, and 20 by means of which respective recording parameters of the motion picture camera 13 (or of the lens 49) may be set. For example, the first lens ring 16 may be provided to adapt the focus distance of the interchangeable lens 49 through rotations, while the focal length may, for example, be settable by means of the second lens ring 18. The lens ring 20 may, for example, be provided to adapt the aperture (f-stop). Respective lens setting motors 15, 17, and 19 are provided to be able to adjust the lens rings 16, 18, and 20. These setting motors 15, 17, and 19 are arranged on a lens ring drive unit 51 that is connected to the camera body 55 in a mechanical manner via two holding bars 75 and in a technical signal manner via a signal line 76. The setting motor associated with the lens ring 16 is designated as the lens focus setting motor 15 in the following.

To be able to check an image of the object space produced by means of the interchangeable lens 49 on an image sensor of the motion picture camera 13 (not shown), and thus the correct alignment of the motion picture camera 13, a viewfinder 53 is further arranged at the camera body 55.

A distance measurement device 91 is furthermore arranged at the camera body 55, faces in the direction of the object space, and is configured to measure the distance from a motif within the object space. The distance measurement device 91 generates a corresponding distance measurement signal. The measurement of the distance may take place in accordance with a known principle, for example by a time of flight measurement or a measurement of a phase shift, in particular by means of ultrasound or electromagnetic waves (e.g. light detection and ranging, LIDAR). The distance measurement device 91 does not, as shown, have to be directly connected to the motion picture camera 13, but may also be arranged at another point of the space, for example on a tripod. The position and the alignment of the respective distance measurement device 91 relative to the motion picture camera 13 must be known so that a distance between the motif and the motion picture camera 13 (in particular an image plane of the motion picture camera 13) may (at least indirectly) be measured. The distance measurement device 91 may also be integrated into the motion picture camera 13 (for example, in the case of an image sensor-based distance measurement). In addition, provision may be made that a distance between the motion picture camera 13 and a further motif within the object space is measured and a corresponding further distance measurement signal is generated (directly or indirectly), wherein this may take place by means of the distance measurement device 91 or by means of a further distance measurement device (not shown).

During a recording of a motion picture sequence by means of such a motion picture camera 13, provision may be made to perform the adaptation of said recording parameters by setting the lens rings 16, 18, and 20 in a remote-controlled manner such that a cameraman may focus solely on the correct alignment of the motion picture camera 13. In this respect, the setting of the parameters of the motion picture camera 13 may take place by a further person, in particular a camera assistant or a focus puller, by means of a remote control device via which the user may set control commands S for the respective lens setting motors 15, 17, and 19 and may transmit them to the motion picture camera 13. A possible embodiment of such a remote control device for the motion picture camera 13 is shown in FIG. 2.

Figure 2:
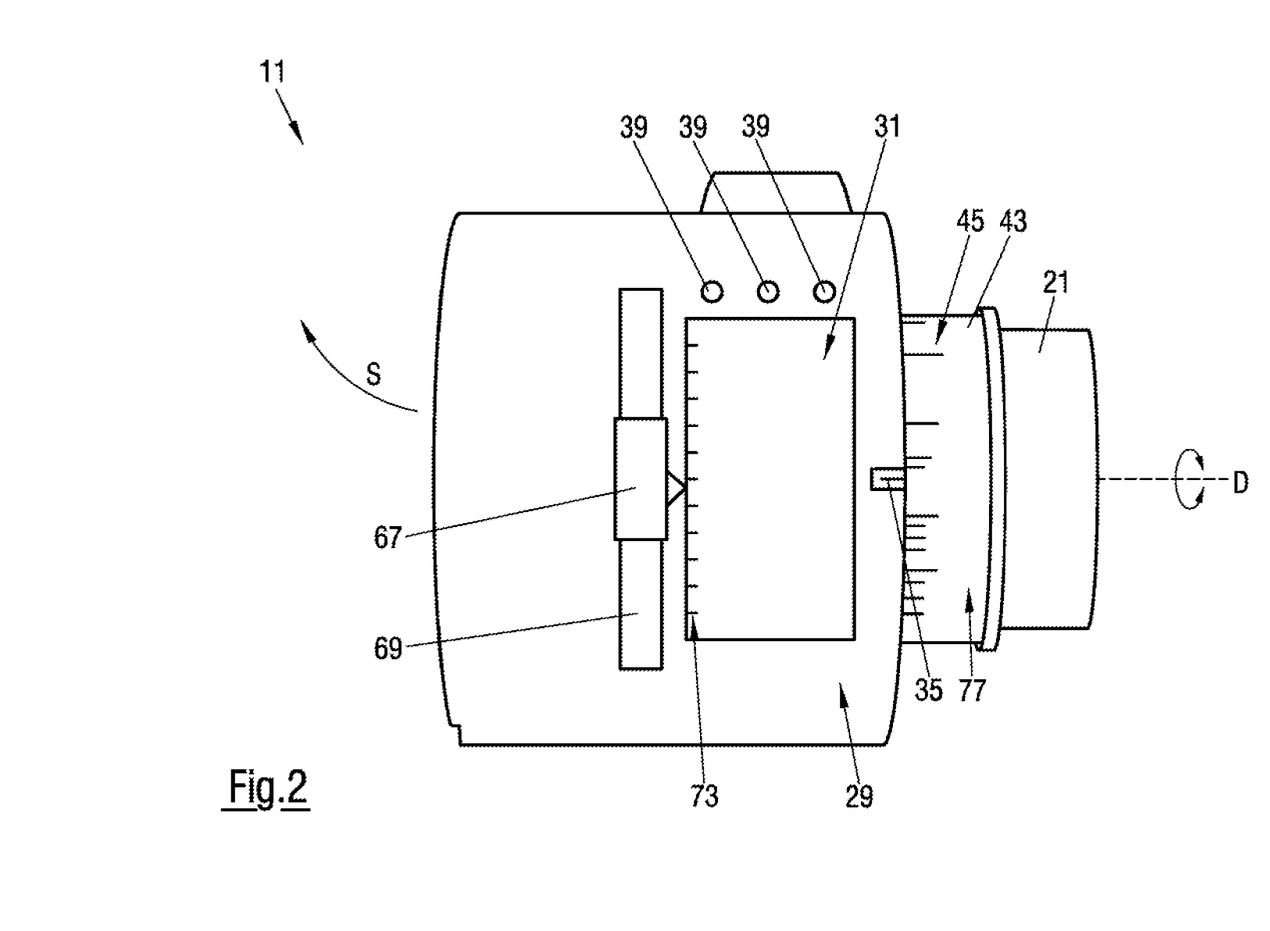
FIG. 2 a representation of a remote control device for generating control commands for the motion picture camera in accordance with FIG. 1.

The remote control device shown in FIG. 2 comprises a portable operating unit 11. The operating unit 11 has a base part 29 and a first operating element 21 which is rotatable relative to the base part 29 about an axis of rotation D and by means of which control commands for the motion picture camera 13 or for at least one of the lens setting motors 15, 17, and 19 may be set. For this purpose, the first operating element 21 is continuously variably movable relative to the base part 29. In this respect, the control commands in particular correspond to a respective desired value to which the recording parameter influenced by the respective lens ring 16, 18, or 20 is to be set. In a manual focus operating mode of the remote control device, the remote control device may determine and output a manual focus setting value as a control command S or as a desired value for the lens focus setting motor 15 (FIG. 1) in dependence on the setting position of the first operating element 21.

A marking ring 43, which bears a marking 45 in the form of a scale at its outer side 77, is rotationally fixedly connected to the first operating element 21. The settable control commands S or values of the influenced parameter of the motion picture camera 13 (e.g. a focus distance) may be read off at the marking 45. To be able to indicate the set control command or the rotational position of the operating element 21, a setting value marking 35 is applied to the base part 29.

To be able to further check or adapt the settings made by means of the operating unit 11, the base part 29 of the remote control device has an electronic display device 31. This display device 31 provides, by means of a display 73, information for a user that may, for example, relate to a further recording parameter of the motion picture camera 13 or to a selection possibility for setting the remote control device itself. Furthermore, a slide control 67 guided in a continuously variable manner in a guide 69 is provided by means of which settings displayed by the display 73 may be selected, for example. The slide control 67 may in particular serve to determine aperture setting values for the lens setting motor 19 in an aperture setting operating mode in order to output corresponding commands for controlling the aperture (f-stop) in accordance with the lens ring 20.

Furthermore, the base part 29 has three buttons 39 in order likewise to be able to input control commands or make settings at the remote control device itself or at the motion picture camera 13. For example, provision may be made to selectively switch the motion picture camera 13 on or off or to start or interrupt a recording by means of one of the buttons 39.

Figure 3:
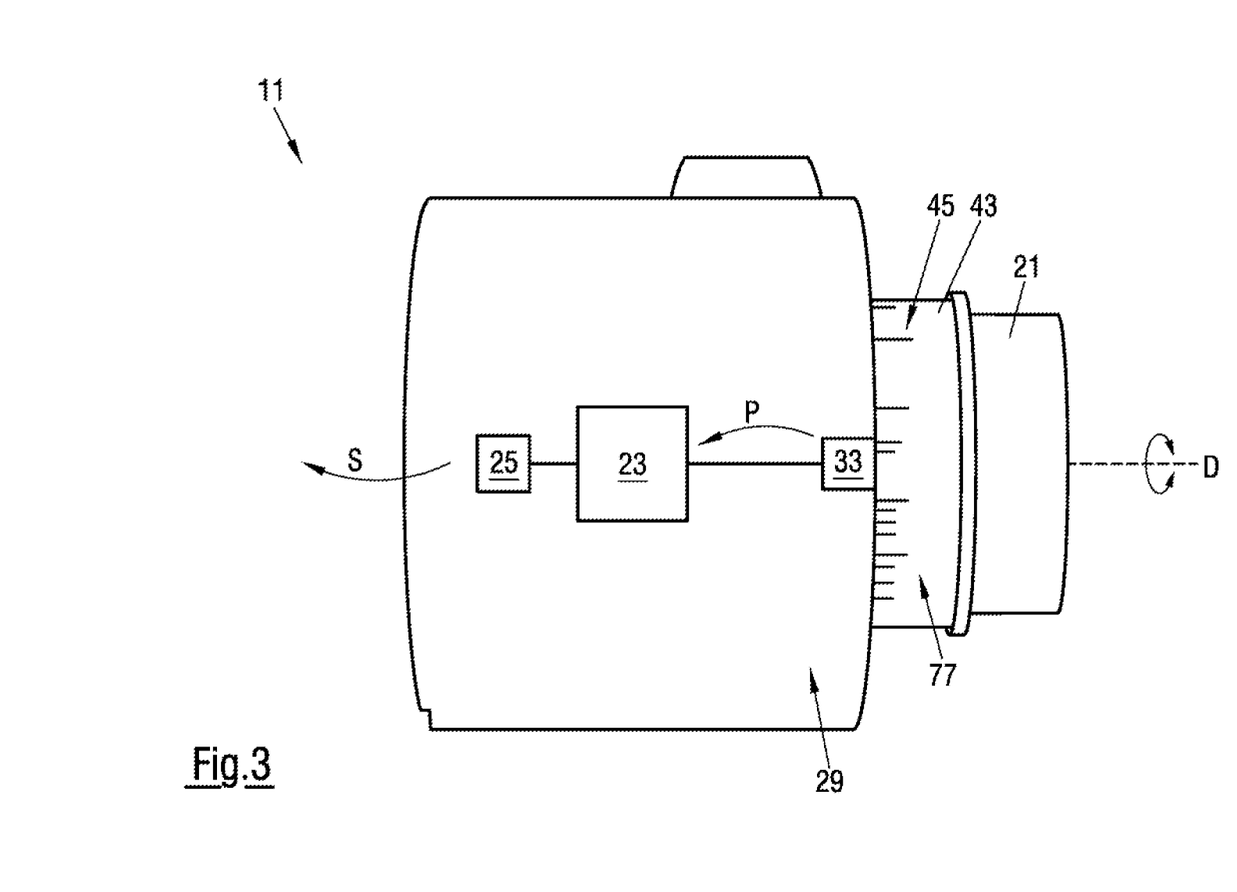
FIG. 3 a schematic block diagram of parts of the remote control device in accordance with FIG. 2.

As the block diagram in accordance with FIG. 3 shows, the operating unit 11 has a position encoder 33 by means of which the setting position of the first operating element 21 relative to the base part 29 may be determined and a corresponding position signal P may be generated. The position encoder 33 is connected to a control device 23. The control device 23 is configured to determine a setting value corresponding to the respective position signal P by means of a mapping rule, said setting value, for example, being able to correspond to said manual focus setting value. A corresponding position encoder may also be provided for the slide control 67 in accordance with FIG. 2.

The control device 23 is connected to an interface 25 to be able to send control commands to the motion picture camera 13 or to the respective lens setting motor 15, 17, or 19. The respective control command may correspond to a determined setting value or may merely be indirectly derived therefrom. In the embodiment example shown, the interface 25 is configured with a radio module for a wireless transmission of the control commands, wherein a wired transmission may generally also be provided. A corresponding interface 26 is provided at the motion picture camera 13 (FIG. 1) to receive the control commands and to transmit them to the lens setting motors 15, 17, or 19 (in particular via the signal line 76 and/or the lens ring drive unit 51). The interface 25 of the operating unit 11 may also serve as an input, for example to receive distance measurement signals of the distance measurement device 91 or actual values of a set focus distance. Accordingly, the interface 26 of the motion picture camera 13 may also serve as an output to transmit corresponding signals.

In the embodiment example of the remote control device shown in FIG. 3, the control device 23 is integrated into the base part 19 of the operating unit 11. Alternatively thereto, a modular design of the remote control device may also be provided in which the control device 23 is formed separately in part from the operating unit 11 and is arranged in or at the motion picture camera 13. Thus, the final determination of desired values for the lens setting motors 15, 17, and 19 may take place on the part of the motion picture camera 13. This is illustrated in FIG. 1 by the part 23' of the control device 23 located there (shown by dashed lines) that receives the required control commands and values from the interface 25 of the operating unit 11 via the reception device 26.

As explained, in a manual focus operating mode, the remote control device may serve to determine a manual focus setting value as a manually predefined desired value for the lens focus setting motor 15 in dependence on the setting position of the first operating element 21 and to output said manual focus setting value to the lens focus setting motor 15 or the lens ring drive unit 51. The control device 23 of the remote control device (including the optional part 23') is further configured, in dependence on an actuation of a second operating element of the operating unit 11, to cause the lens focus setting motor 15 in a focus transition operating mode to set the focus distance in accordance with a sequence of a plurality of different intermediate focus setting values that converge to a second desired value of the focus distance starting from a first desired value of the focus distance, wherein the first desired value or the second desired value of the focus distance corresponds to the distance measurement signal of the distance measurement device 91. The second operating element may, for example, be formed by the slide control 67 or by one of the buttons 39 (FIG. 2).

Thus, on the one hand, the remote control device enables a manual focusing by moving the first operating element 21 relative to the base part 29 of the operating unit 11. On the other hand, the user, by means of the second operating element (e.g. the slide control 67 or the button 39), may cause the control device 23 to cause the lens focus setting motor 15, starting from an already set first desired value, to set the focus distance in accordance with a sequence of a plurality of intermediate focus setting values, wherein this sequence converge to the set respective focus distance to a second desired value that is already at least substantially fixed at the start of the focus transition operating mode. A continuous or substantially continuous transition between the first desired value and the second desired value of the focus distance may hereby be effected. The intermediate focus setting values may in particular correspond to a variably weighted interpolation between the first desired value of the focus distance and the second desired value of the focus distance. The focus transition operating mode of the remote control device may thus in particular serve for a transition between the manual focus operating mode and an autofocus operating mode (automatic focusing in accordance with the distance measurement device) or for a transition between different autofocus operating modes (as will be explained in the following). Due to such a focus transition operating mode of the remote control device, a smooth transition is made possible on a change from a first desired value to a second desired value of the focus distance, in particular on a change of the source for the respective desired value.

In accordance with a first embodiment example, the slide control 67 (FIG. 2) may serve as the second operating element, wherein the control device 23 is configured to determine a respective transition setting value in dependence on the respective intermediate position of the slide control 67, wherein the control device 23 determines the intermediate focus setting values in dependence on the respective transition setting value and transmits them (directly or indirectly) to the lens focus setting motor 15 as current desired values of the focus distance.

For this purpose, provision may be made that a distance measurement signal of the distance measurement device 91 (FIG. 1) and a manual focus setting value selected by means of the first operating element 21 serve as a first desired value and a second desired value, or vice versa. In this embodiment example, the control device 23 may be configured, in the case that the slide control 67 is moved to a first end abutment of the guide 69, to cause the lens focus setting motor 15 to set the focus distance in accordance with the distance measurement signal of the distance measurement device 91 (FIG. 1);

in the case that the slide control 67 is moved to a second end abutment of the guide 69, to cause the lens focus setting motor 15 to set the focus distance in accordance with the manual focus setting value, wherein the manual focus setting value may in particular have already been set by means of the first operating element 21 before or at the start of the focus transition operating mode; and in the case that the slide control 67 is moved into an intermediate position, to cause the lens focus setting motor 15 to set the focus distance in accordance with the respective determined intermediate focus setting value.

In accordance with a similar second embodiment example, the slide control 67 may again serve as the second operating element, wherein, however, a distance measurement signal of the distance measurement device 91 (FIG. 1) and another distance measurement signal of the distance measurement device 91 or of another distance measurement device may serve as the first desired value and second desired value, or vice versa. In such an embodiment example, the control device 23 may be configured, in the case that the slide control 67 is moved to a first end abutment of the guide 69, to cause the lens focus setting motor 15 to set the focus distance in accordance with the distance measurement signal of the distance measurement device 91;

in the case that the slide control 67 is moved to a second end abutment of the guide 69, to cause the lens focus setting motor 15 to set the focus distance in accordance with another distance measurement signal; and in the case that the slide control 67 is moved into an intermediate position, to cause the lens focus setting motor 15 to set the focus distance in accordance with the respective determined intermediate focus setting value.

In accordance with a third embodiment example, one of the buttons 39 (FIG. 2) may serve as the second operating element, wherein an actuation of the button 39 triggers the focus transition operating mode. In such an embodiment example, the control device 23 may be configured to cause the lens focus setting motor 15 in the focus transition operating mode to set the focus distance in accordance with the sequence of a plurality of different intermediate focus setting values, in particular automatically, in accordance with a predetermined course of the transition between the first desired value of the focus distance value and the second desired value of the focus distance. This predetermined course may, for example, be controlled by the control device in accordance with a stored value table or calculation rule. The predetermined course of the transition may, for example, vary in accordance with a predetermined time duration or a predetermined speed.

In this embodiment example, one of the two desired values of the focus distance may also correspond to the distance measurement signal of the distance measurement device 91, and the other of the two desired values of the focus distance may correspond to the manual focus setting value in accordance with the first operating element 21 of the operating unit or to a further distance measurement signal.

The focus transition operating mode of the remote control device thus enables a smooth transition from a first desired value to a second desired value of the focus distance set at the lens 49.

REFERENCE NUMERAL LIST

11 operating unit
13 motion picture camera
15 first lens setting motor
16 first lens ring
17 second lens setting motor
18 second lens ring
19 third lens setting motor
20 third lens ring
21 operating element
23 control device
23 control device
25 interface
26 interface
29 base part
31 display device
33 position encoder
35 setting value marking
39 button 43 marking ring
45 marking
49 interchangeable lens
51 lens ring drive unit
53 viewfinder
55 camera body
67 slide control
69 guide
73 display
75 holding bar
76 signal line
91 distance measurement device
D axis of rotation
P position signal
S control command

The invention claimed is:

1. A remote control device for a motion picture camera which has a lens and at least one lens focus setting motor for setting a focus distance of the lens and with which at least one distance measurement device for determining a distance measurement signal is associated, said remote control device comprising a portable operating unit, wherein the operating unit has:
a base part,
a first operating element that is movable relative to the base part into a continuously variable setting position, and
a second operating element,
wherein the remote control device has a control device that is configured to determine a manual focus setting value for the lens focus setting motor in dependence on the continuously variable setting position of the first operating element and to output the manual focus setting value in a manual focus operating mode;
wherein the control device is further configured, in dependence on an actuation of the second operating element of the operating unit, to cause the lens focus setting motor in a focus transition operating mode to set the focus distance in accordance with a sequence of a plurality of different intermediate focus setting values that converge to a second desired value of the focus distance starting from a first desired value of the focus distance, wherein the first desired value or the second desired value of the focus distance corresponds to the distance measurement signal of the distance measurement device;
wherein the second operating element is movable relative to the base part of the operating unit between a first control position and a second control position into continuously variable intermediate positions, wherein the control device is configured to determine a respective transition setting value in dependence on the respective intermediate position of the second operating element, wherein the intermediate focus setting values depend on the respective transition setting value; and
wherein the control device is configured,
in the case that the second operating element is moved into the first control position, to cause the lens focus setting motor to set the focus distance in accordance with the distance measurement signal of the distance measurement device;
in the case that the second operating element is moved into the second control position, to cause the lens focus setting motor to set the focus distance in accordance with the manual focus setting value; and
in the case that the second operating element is moved into one of the continuously variable intermediate positions, to cause the lens focus setting motor to set the focus distance in accordance with the respective intermediate focus setting value.

2. A remote control device in accordance with claim 1, wherein the sequence of the plurality of different intermediate focus setting values corresponds to a continuous or substantially continuous convergence of the focus distance from the first desired value to the second desired value.

3. A remote control device in accordance with claim 1, wherein one of the first and second desired values of the focus distance corresponds to the distance measurement signal of the distance measurement device, and wherein the other of the first and second desired values of the focus distance corresponds to the manual focus setting value or to a further distance measurement signal.

4. A remote control device in accordance with claim 1, wherein the intermediate focus setting values correspond to a respective interpolation between the first desired value of the focus distance and the second desired value of the focus distance.

5. A remote control device in accordance with claim 1, wherein the control device is completely integrated into the operating unit, or wherein one part of the control device is integrated into the operating unit and another part of the control device is arranged at the motion picture camera.

6. A remote control device in accordance with claim 1, wherein the operating unit has an interface for communicating with the motion picture camera.

7. A remote control device in accordance with claim 1, wherein the intermediate focus setting values correspond to an interpolation, weighted in accordance with the respective transition setting value, between the first desired value of the focus distance and the second desired value of the focus distance.

8. A remote control device in accordance with claim 1, wherein the second operating element is linearly or rotatably movable relative to the base part.

9. A remote control device in accordance with claim 1, wherein the first control position corresponds to a first end abutment of the second operating element, and wherein the second control position corresponds to a second end abutment of the second operating element.

10. A remote control device in accordance with claim 1, wherein the control device is configured to determine and to output aperture setting values for a lens aperture setting motor of the motion picture camera in an aperture setting operating mode, which is different from the focus transition operating mode, in dependence on the continuously variable intermediate positions of the second operating element.

11. A remote control device in accordance with claim 1, wherein the intermediate focus setting values correspond to an interpolation between the distance measurement signal of the distance measurement device and the manual focus setting value in accordance with the setting position of the first operating element.

12. A remote control device in accordance with claim 1, wherein the control device is configured to receive the distance measurement signal of the distance measurement device; to determine the intermediate focus setting values in dependence on the manual focus setting value, the distance measurement signal and the respective transition setting value; and to output the intermediate focus setting values.

13. A remote control device in accordance with claim 1, wherein the control device is configured,
   in the case that the second operating element is moved into the first control position, to cause the lens focus setting motor to set the focus distance in accordance with the distance measurement signal of the distance measurement device;
   in the case that the second operating element is moved into the second control position, to cause the lens focus setting motor to set the focus distance in accordance with a further distance measurement signal; and
   in the case that the second operating element is moved into one of the continuously variable intermediate positions, to cause the lens focus setting motor to set the focus distance in accordance with the respective intermediate focus setting value.

14. A remote control device in accordance with claim 13, wherein the intermediate focus setting values correspond to an interpolation between the distance measurement signal of the distance measurement device and the further distance measurement signal.

15. A remote control device in accordance with claim 13, wherein the control device is configured to receive the distance measurement signal of the distance measurement device and receive the further distance measurement signal; to determine the intermediate focus setting values in dependence on the distance measurement signal, the further distance measurement signal and the respective transition setting value; and to output the intermediate focus setting values.

16. A remote control device in accordance with claim 1, wherein the control device is configured to adopt the focus transition operating mode in response to the actuation of the second operating element of the operating unit, wherein the control device is configured to cause the lens focus setting motor in the focus transition operating mode to set the focus distance in accordance with the sequence of a plurality of different intermediate focus setting values in a predetermined course of the transition between the first desired value of the focus distance and the second desired value of the focus distance.

17. A remote control device in accordance with claim 16, wherein the different intermediate focus setting values correspond to differently weighted interpolations between the first desired value of the focus distance and the second desired value of the focus distance, wherein the weighting of the interpolation varies in accordance with the predetermined course of the transition such that a continuous transition of the setting of the focus distance is automatically triggered by the actuation of the second operating element.

18. A remote control device in accordance with claim 16, wherein the predetermined course of the transition varies in accordance with a predetermined time duration or a predetermined speed.

19. A remote control device in accordance with claim 16, wherein the predetermined course of the transition corresponds to a linear ramp.

20. A remote control device in accordance with claim 16, wherein the remote control device has an interface via which a desired course of the transition between the first desired value of the focus distance and the second desired value of the focus distance can be programmed by a user.

21. A remote control device for a motion picture camera which has a lens and at least one lens focus setting motor for setting a focus distance of the lens and with which at least one distance measurement device for determining a distance measurement signal is associated,
   said remote control device comprising a portable operating unit, wherein the operating unit has:
      a base part,
      a first operating element that is movable relative to the base part into a continuously variable setting position, and
      a second operating element,
   wherein the remote control device has a control device that is configured to determine a manual focus setting value for the lens focus setting motor in dependence on the continuously variable setting position of the first operating element and to output the manual focus setting value in a manual focus operating mode;
   wherein the control device is further configured, in dependence on an actuation of the second operating element of the operating unit, to cause the lens focus setting motor in a focus transition operating mode to set the focus distance in accordance with a sequence of a plurality of different intermediate focus setting values that converge to a second desired value of the focus distance starting from a first desired value of the focus distance, wherein the first desired value or the second desired value of the focus distance corresponds to the distance measurement signal of the distance measurement device; and
   wherein the control device is configured to adopt the focus transition operating mode in response to the actuation of the second operating element of the operating unit, wherein the control device is configured to cause the lens focus setting motor in the focus transition operating mode to set the focus distance in accordance with the sequence of a plurality of different intermediate focus setting values in a predetermined course of the transition between the first desired value of the focus distance and the second desired value of the focus distance.

22. A remote control device for a motion picture camera which has a lens and at least one lens focus setting motor for setting a focus distance of the lens and with which at least one distance measurement device for determining a distance measurement signal is associated,
   said remote control device comprising a portable operating unit, wherein the operating unit has:
      a base part,
      a first operating element that is movable relative to the base part into a continuously variable setting position, and
      a second operating element,
   wherein the remote control device has a control device that is configured to determine a manual focus setting value for the lens focus setting motor in dependence on the continuously variable setting position of the first operating element and to output the manual focus setting value in a manual focus operating mode;
   wherein the control device is further configured, in dependence on an actuation of the second operating element of the operating unit, to cause the lens focus setting motor in a focus transition operating mode to set the focus distance in accordance with a sequence of a plurality of different intermediate focus setting values that converge to a second desired value of the focus distance starting from a first desired value of the focus distance, wherein the first desired value or the second desired value of the focus distance corresponds to the distance measurement signal of the distance measurement device;

wherein the second operating element is movable relative to the base part of the operating unit between a first control position and a second control position into continuously variable intermediate positions, wherein the control device is configured to determine a respective transition setting value in dependence on the respective intermediate position of the second operating element, wherein the intermediate focus setting values depend on the respective transition setting value; and wherein the second operating element is linearly movable relative to the base part.

* * * * *